Figure 1:
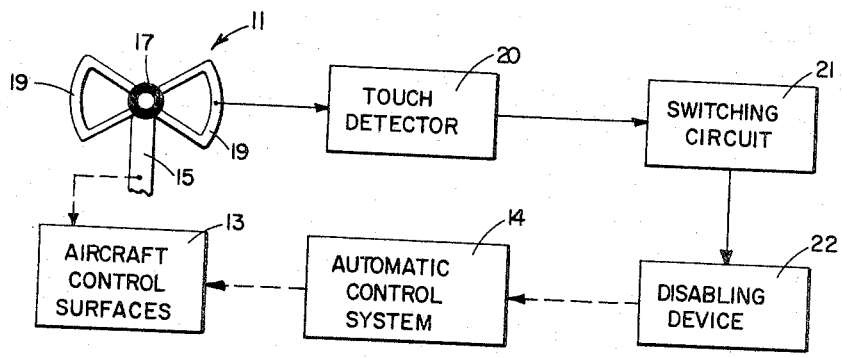

Aug. 22, 1967 K. FRUDENFELD 3,337,163
AIRCRAFT TOUCH CONTROL SYSTEM
Filed May 10, 1965

INVENTOR
KARL FRUDENFELD
BY Edward A. Sobieski
ATTORNEY

United States Patent Office 3,337,163
Patented Aug. 22, 1967

3,337,163
AIRCRAFT TOUCH CONTROL SYSTEM
Karl Frudenfeld, Rolling Hills, Calif., assignor to Brittan Industries, Inc., Hawthorne, Calif., a corporation of California
Filed May 10, 1965, Ser. No. 454,340
7 Claims. (Cl. 244—77)

This invention relates to an aircraft touch control system, and more particularly to such a system in which control of the aircraft is transferred from an automatic control system to a manual control in response to the touch of the pilot's hand on the manual control.

In utilizing the automatic flight control systems, it is essential that the pilot be able to override such a system to take control of the aircraft himself at an instant's notice. It is generally difficult for the pilot to override the mechanical control force applied by the automatic control system. Therefore, means are usually provided for disconnecting the automatic control system when manual control is desired. These disconnect devices generally involve the use of a manual switch which the pilot must actuate before he takes control. In an emergency situation, where immediate manual control action is necessary, these switching systems of the prior art leave much to be desired, in view of the delay involved in their implementation. Thus, where traveling at aircraft speeds, a delay in the take-over of the aircraft by the pilot of even a few seconds could result in disaster.

The system of this invention overcomes the shortcomings of prior art switch-over devices in providing instantaneous switch-over from automatic to manual control whenever the pilot puts his hand on the manual controls. Thus, all the pilot need do is follow his normal reflexive response and grab the manual control to take over control of the aircraft from the automatic flight control system. No manual switches need be actuated or other action taken to effect this end result. Control is immediately restored to the automatic flight control system whenever the pilot removes his hands from the manual control.

This desired end result is achieved in the system of the invention by providing touch detector means for sensing the touch of the pilot's hand on the manual control. The output of the touch detector means is utilized to actuate a switching circuit which in turn actuates a disabling device. The disabling device operates to disable the automatic control system, placing the aircraft in manual control. When the pilot removes his hand from the manual control, operation in response to the automatic control system is restored. Thus, switch-over from manual control to automatic control, and vice versa, is achieved respectively when the pilot touches the manual control and removes his hand therefrom.

It is therefore an object of this invention to provide a touch control system for an aircraft wherein the aircraft's control wheel or stick is an integral part of an automatic disconnect system for the aircraft automatic control system.

It is a further object of this invention to provide an improved aircraft control system having greater safety than prior art systems.

It is still another object of this invention to lessen the response time in switching over from automatic to manual control of an aircraft.

It is still a further object of this invention to provide a simple yet highly reliable control system for transferring control from an automatic control system to a manual controller and vice versa, in response to the touching and unhanding of the manual control by the pilot.

Other objects of this invention will become apparent from the following description taken in connection with the accompanying drawings, of which FIG. 1 is a block diagram illustrating the basic operation of the inventive system.

Figure 2:
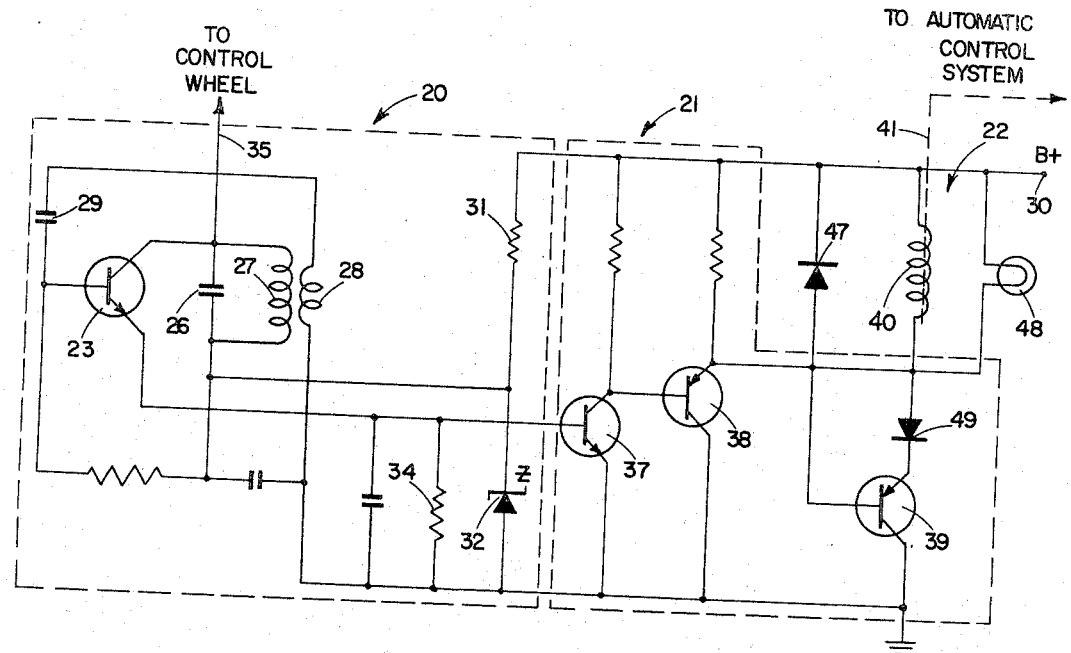
Figure 3:
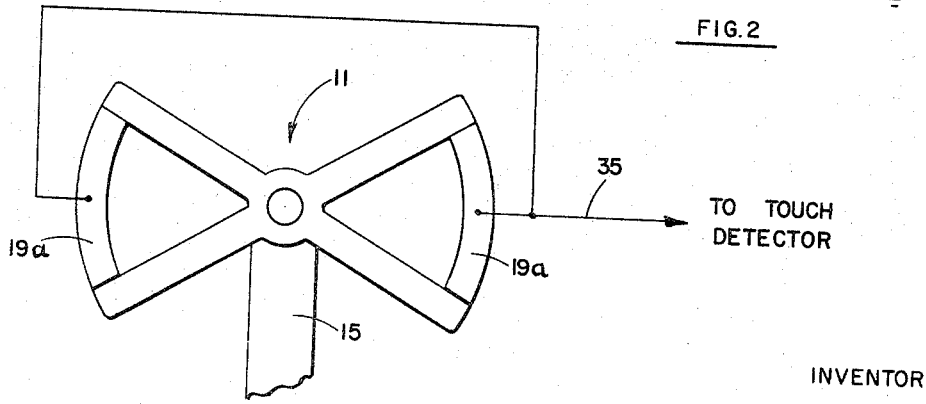

FIG. 2 is a schematic drawing of a touch detector, switching circuit and switching device that may be utilized in the device of the invention, and FIG. 3 is a schematic drawing illustrating a control wheel that may be utilized with the device of the invention.

Referring now to FIG. 1, a block diagram illustrating the basic operation of the device of the invention is shown. When the pilot's hand is not touching control wheel 11, aircraft control surfaces 13, which may include any suitable means for maneuvering the aircraft, are controlled by automatic control system 14, which may comprise an autopilot. Control wheel 11, if metallic, is electrically insulated from control shaft 15 by means of an insulating bushing 17, or any other suitable means. At least the outer surfaces of handgrip portions 19 of control wheel 11 are electrically conductive and form an integral part of the circuitry of touch detector 20, so that when the pilot's hand is placed thereon, an electrical signal is fed to touch detector 20, so as to provide an actuation signal from this detector. The output of touch detector 20 is fed to switching circuit 21 thereby actuating this circuit, and switching circuit 21 in turn actuates disabling device 22. Disabling device 22, which may involve either a mechanical or electrical disconnect mechanism, operates to disable automatic control system 14 when the pilot's hand is on at least one of handgrip portions 19 of the control wheel. When the pilot's hand is removed from the control wheel, touch detector 20 is deactuated and control of the aircraft control surfaces 13 is restored to automatic control system 14.

Referring now to FIG. 2, a schematic diagram of a touch detector, switching circuit and disabling device which may be utilized in the device of the invention is illustrated. Touch detector 20 comprises a free-running feedback oscillator comprising transistor 23. The frequency of oscillation, which in an operative embodiment is in the neighborhood of 2 megacycles, is determined primarily by the capacitance of capacitor 26 and the inductance of coil 27. Feedback to sustain oscillation is provided by means of feedback coil 28 and capacitor 29. Power is supplied to the oscillator circuit from terminal 30 which is connected through resistor 31 to zener diode 32. Zener diode 32 acts to regulate the DC voltage which is fed to the oscillator circuit to insure stable operation thereof.

Under normal resonant operating conditions, i.e., with the pilot's hand not on grip portions 19 of the control wheel, current is drawn by the base of transistor 23 on the positive half cycles of the radio frequency signals, so as to charge capacitor 29 to provide negative bias to the transistor base. The emitter current of transistor 23 is kept relatively low by virtue of this biasing action. Under such conditions, the current through resistor 34 is relatively low and transistor 37 is maintained cut off. The tuning circuit of the oscillator, which includes capacitor 26 and inductor 27, is connected through line 35 to the handgrip portions 19 of the control wheel. As already noted, these handgrip portions are fabricated so that at least their surfaces are electrically conductive. When the pilot's hand is brought into contact with these electrically conductive surfaces, a load is placed on the tuning circuit in view of the shunting capacitance and resistance introduced by such hand contact. The oscillator tuning circuit has a relatively high impedance, and this hand contact loads down the oscillator circuit sufficiently to cause oscillation of the oscillator to cease. With the cessation of oscillation, the reverse bias at the base of transistor 23 is no longer available and the emitter current to transistor 23 through resistor 34 increases substantially. Transistor 37, as already noted, and transistors 38 and 39, which are dependent on transistor 37 for their drive, are maintained at cutoff when the oscillator is oscillating. With the increased current through resistor 34 with the cessation of the oscillation of the oscillator circuit, the forward biasing potential between the emitter and base of transistor 37 is increased sufficiently to cause this transistor to go to the conductive state. With the conduction of transistor 37, transistors 38 and 39 which are connected in cascade are likewise driven to the conductive state.

Connected between terminal 30, which is attached to the B+ power source, and the emitter of transistor 39 is the coil 40 of disabling device 22, which comprises a solenoid. With the conduction of transistor 39, solenoid coil 40 is energized drawing its actuator mechanism 41 downward to drive an appropriate valve device in the automatic control system to disable such system. In situations where application demands so dictate, an electrical relay can be utilized in lieu of solenoid 40 to electrically deactivate the control system.

Indicator lamp 48 is connected in parallel with solenoid coil 40, whereby this indicator lamp is ignited whenever the solenoid coil 40 is energized. Lamp 48 thus provides an indication to the pilot that the manual control has taken over. Diode 47 is connected across coil 40 to damp out reverse voltage spikes which might cause erratic functioning of the solenoid. Diode 49 provides additional hold-off bias for transistor 39 to assure reliable operation under increased temperature conditions.

As can be seen, when the pilot releases his hand contact with control wheel grip portions 19, the loading effect on the oscillator circuit is removed, and the oscillation thereof is resumed. This restores the increased reverse biasing on transistor 23 so as to lower the emitter current of this transistor and thus removes the drive signal from the base circuit of transistor 37. Under such conditions, transistors 37, 38 and 39 are deactivated, as is disabling device 22, thereby restoring control to the automatic control system.

Referring now to FIG. 3, a control wheel which may be utilized with the device of the invention is illustrated. As already noted, it is essential for proper operation of the device of the invention that the portions of the control wheel touched by the pilot in assuming manual control of the aircraft be electrically conductive and at the same time insulated from the frame of the aircraft. In the case of an all-metal control wheel 11 and control shaft 15, it is therefore necessary that an insulating bushing 17 as shown in FIG. 1 be utilized to isolate the wheel from the frame of the aircraft. If a non-conductive wheel of, for example, plastic is utilized, as is shown in FIG. 3, the handgrip portions 19 must be made electrically conductive. This end result can be achieved by several techniques. First, metal sleeves 19a may be installed around gripping portions 19. An alternative would be to paint or plate these portions with a conductive material. The electrically conductive portions 19a of handgrips 19 are connected to electrical lead wire 35 which in turn is connected to the oscillator tuning circuit.

The system of this invention thus provides simple yet highly effective means for instantaneously shifting control of an aircraft from manual to automatic control, and vice versa, in response to the hand contact of the pilot on the control wheel and the removal of such hand contact respectively. Thus, such switchover is accomplished in response to the normal action of the pilot in assuming control of the aircraft without any necessity for special action on his part.

While the system of the invention has been described and illustrated in detail, it is to be clearly understood that this is intended by way of illustration and example only and is not to be taken by way of limitation, the spirit and scope of this invention being limited only by the terms of the following claims.

I claim:
1. In an aircraft having control surfaces,
automatic control system means for automatically controlling the control surfaces of said aircraft,
manual control means for manually controlling the control surfaces of said aircraft, and
means for disabling said automatic control system means and permitting control by said manual control means when the pilot's hand is in contact with a predetermined part of said manual control means comprising
touch detector means for sensing the touch of the pilot's hand on said predetermined part of said manual control means, and
control means responsively connected to said touch detector means for disabling said automatic control system means,
said predetermined part of said manual control means being electrically conductive and electrically connected to said touch detector means, said predetermined part being electrically insulated from the frame of said aircraft,
contact of the pilot's hand with said part providing an electrical loading effect on said touch detector means causing said detector means to generate a control signal for said control means.

2. The combination as recited in claim 1 wherein said manual control means includes a control wheel, said control wheel including said predetermined part of said manual control means.

3. The combination as recited in claim 2 wherein said control wheel includes hand grip portions and is fabricated of an electrically insulating material, the surfaces of said hand grip portions being electrically conductive, said predetermined part of said manual control means comprising said hand grip portions.

4. The combination as recited in claim 1 wherein said control means includes a switching circuit responsively connected to the output of said touch detector means and disabling device means responsively connected to said switching device for disabling said automatic control system means.

5. In an aircraft,
automatic control system means for automatically controlling said aircraft,
manual control means for manually controlling said aircraft, and
means for disabling said automatic control system means and permitting control by said manual control means when the pilot's hand is in contact with a predetermined part of said manual control means comprising
touch detector means for sensing the touch of the pilot's hand on said predetermined part of said manual control means, and
control means responsively connected to said touch detector means for disabling said automatic control system means,
said predetermined part of said manual control means being electrically conductive and electrically connected to said touch detector means, said part being electrically insulated from the frame of the aircraft,
contact of the pilot's hand with said part providing an electrical loading effect on said touch detector means causing said detector means to generate a control signal for said control means.

6. In an aircraft,
automatic control system means for automatically controlling said aircraft,
manual control means for manually controlling said aircraft, and
means for disabling said automatic control system means and permitting control by said manual control means when the pilot's hand is in contact with a predetermined part of said manual control means comprising
touch detector means for sensing the touch of the pilot's hand on said predetermined part of said manual control means, said touch detector means comprising an oscillator having an inductive-capacitive tuning circuit, said predetermined part of said manual control means being connected to said tuning circuit, said manual control means being fabricated principally of elecrtically non-conductive material, said predetermined part of said manual control means being electrically conductive, and control means responsively connected to said touch detector means for disabling said automatic control system means, whereby when the pilot's hand touches said predetermined part of said manual control means, said tuning circuit is loaded so as to cause said oscillator to cease oscillating thereby providing a control signal to said control means.

7. In an aircraft,
an automatic control system for automatically controlling said aircraft,
a manual control for manually controlling said aircraft, and
means for disabling said automatic control system when the pilot's hand touches said manual control and restoring operation of said automatic control system when the pilot's hand is released from said manual control comprising a touch detector comprising an oscillator for providing a predetermined control signal when the pilot's hand is touching said manual control, a switching circuit for producing a control current in response to said control signal, and means responsive to said control current for disabling said automatic control system, said manual control having a hand grip portion with electrically conductive surfaces, said hand grip portion surfaces being connected to the tuning circuit of said oscillator, whereby when the pilot's hand touches said hand grip portion surfaces, the oscillator tuning circuit is loaded to cause said oscillator to cease oscillating, thereby generating said predetermined control signal.

References Cited
UNITED STATES PATENTS

| | | | |
|---|---|---|---|
| 2,439,750 | 4/1948 | Nisbet et al. | 244—77 |
| 2,873,418 | 2/1959 | Owen | 318—489 |
| 3,254,313 | 5/1966 | Atkins et al. | 331—65 X |

FERGUS S. MIDDLETON, *Primary Examiner.*